United States Patent [19]
Gonzalez et al.

[11] Patent Number: 5,584,511
[45] Date of Patent: Dec. 17, 1996

[54] MULTI-DEGREE-OF-FREEDOM EXPANSION JOINT

[75] Inventors: Antonio S. Gonzalez, Beavercreek; Mark K. Meyer, Centerville; Michael R. Storage, Beavercreek; Bradley J. Johnston, Springfield, all of Ohio

[73] Assignee: General Electric Company, Cincinnati, Ohio

[21] Appl. No.: 547,004

[22] Filed: Oct. 23, 1995

[51] Int. Cl.⁶ .................................................. F16L 11/12
[52] U.S. Cl. ........................ 285/45; 285/165; 285/166; 285/271
[58] Field of Search ................................. 285/163, 164, 285/165, 166, 299, 300, 301, 226, 262, 271, 45

[56] References Cited

U.S. PATENT DOCUMENTS

| | | | |
|---|---|---|---|
| 2,475,834 | 7/1949 | Harvey | 285/271 |
| 2,616,728 | 11/1952 | Pitt | 285/165 X |
| 2,712,456 | 7/1955 | McCreery | 285/165 |
| 4,350,372 | 9/1982 | Logsdon | 285/45 |
| 4,553,775 | 11/1985 | Halling | 285/166 X |
| 4,856,822 | 8/1989 | Parker | 285/62 |
| 4,893,847 | 1/1990 | Hess | 285/226 |
| 5,286,071 | 2/1994 | Storage | 285/226 |
| 5,340,165 | 8/1994 | Sheppard | 285/226 |

FOREIGN PATENT DOCUMENTS

| | | | |
|---|---|---|---|
| 2107816 | 5/1983 | United Kingdom | 285/226 |

OTHER PUBLICATIONS

GE Aircraft Engines, "Low Pressure Turbine Module–External Tubes," CF6–80C2, Figure 1, Sheet 2, Jun. 1993.
Pressure Science Corporation, "Engineer's Data Book," 1988, pp.: cover and 93–129.

*Primary Examiner*—Dave W. Arola
*Attorney, Agent, or Firm*—Andrew C. Hess; Patrick R. Scanlon

[57] ABSTRACT

An expansion joint includes a pair of tubular fittings joined together by a bellows for accommodating differential movement therebetween. The fittings include balls at respective distal ends thereof which engage complementary sockets fixedly joined to opposite ends of the bellows. The respective ball and sockets additionally accommodate pivotal and rotary movement. The bellows allows pressure and spring forces to engage the sockets against their respective balls for continuously seating the balls in the sockets during operation and maintaining effective seals against leakage.

8 Claims, 4 Drawing Sheets

MULTI-DEGREE-OF-FREEDOM EXPANSION JOINT

BACKGROUND OF THE INVENTION

The present invention relates generally to gas turbine engines, and, more specifically, to expansion joints therein for accommodating differential thermal movement of fluid carrying components.

A gas turbine engine includes a compressor for compressing air which is suitably mixed with fuel and ignited in a combustor for generating hot combustion gases which flow downstream through one or more turbines. Various components of the turbines are cooled by using a portion of the compressed air bled from the compressor for use as cooling air. The cooling air bled from the compressor is channeled through suitable conduits and joints to the various components requiring cooling, with many of the conduits being subjected to differential thermal movement and vibratory excitation during operation.

Fluid carrying joints such as those used in the bleed air system take various conventional forms including ball and socket joints which allow relative pivotal movement, with the joints also being conventionally configured for also accommodating differential translation between adjacent ends of the conduits. However, traditional graphite ball joints are subject to undesirable leakage in view of the various differential pivotal and translation movement to which the joint is subjected to during operation, as well as due to vibratory excitation. As the ball joints wear during operation, leakage therefrom becomes more and more of a problem until the traditional graphite ball joints require replacement at substantial cost.

SUMMARY OF THE INVENTION

An expansion joint includes a pair of tubular fittings joined together by a bellows for accommodating differential movement therebetween. The fittings include balls at respective distal ends thereof which engage complementary sockets fixedly joined to opposite ends of the bellows. The respective ball and sockets additionally accommodate pivotal movement. The bellows allows pressure and spring forces to engage the sockets against their respective balls for continuously seating the balls in the sockets during operation and maintaining effective seals against leakage.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
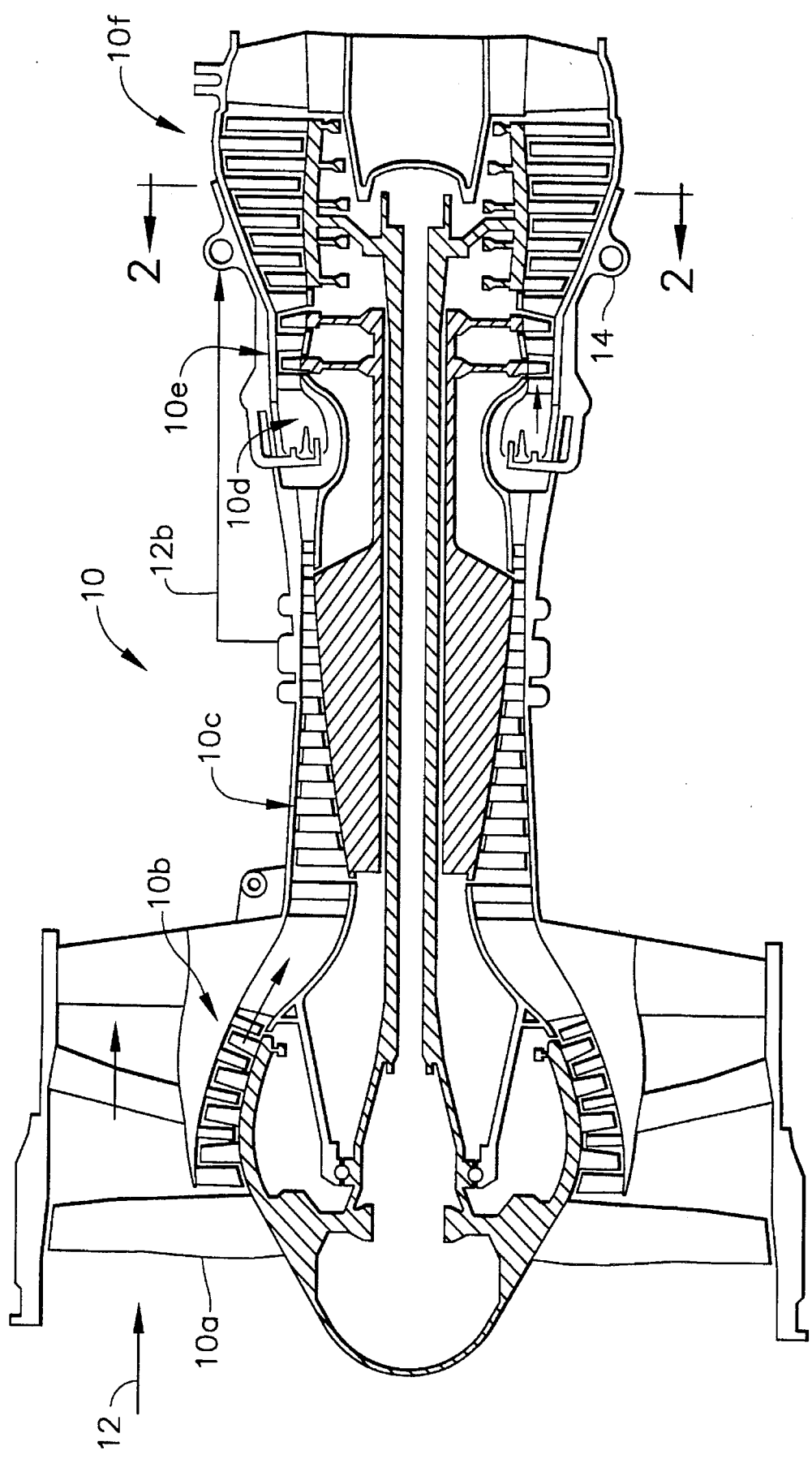
FIG. 1 is an exemplary aircraft turbofan gas turbine engine having a bleed air system channeling a portion of compressed air to an annular manifold surrounding a low pressure turbine for cooling thereof.

Illustrated schematically in FIG. 1 is an axial, partly sectional view of an exemplary aircraft turbofan gas turbine engine 10. The engine 10 includes in serial flow communication a fan 10a, low pressure compressor 10b, high pressure compressor 10c, combustor 10d, high pressure turbine 10e, and low pressure turbine 10f operatively joined together with a pair of rotor shafts and being conventional in configuration and operation. During operation, air 12 flows downstream through the fan 10a and is compressed in the compressors 10b,c, with the majority of the compressed air being suitably mixed with fuel and ignited in the combustor 10d for generating combustion gases which are channeled through the turbines 10e,f for powering the engine in flight.

In the exemplary embodiment illustrated in FIG. 1, selected components of the low pressure turbine 10f are cooled in a conventional manner, and are supplied with a portion of the compressed air 12 bled from a suitable stage of the high pressure compressor 10c for providing cooling air 12b to the low pressure turbine 10f through a bleed air system.

Figure 2:
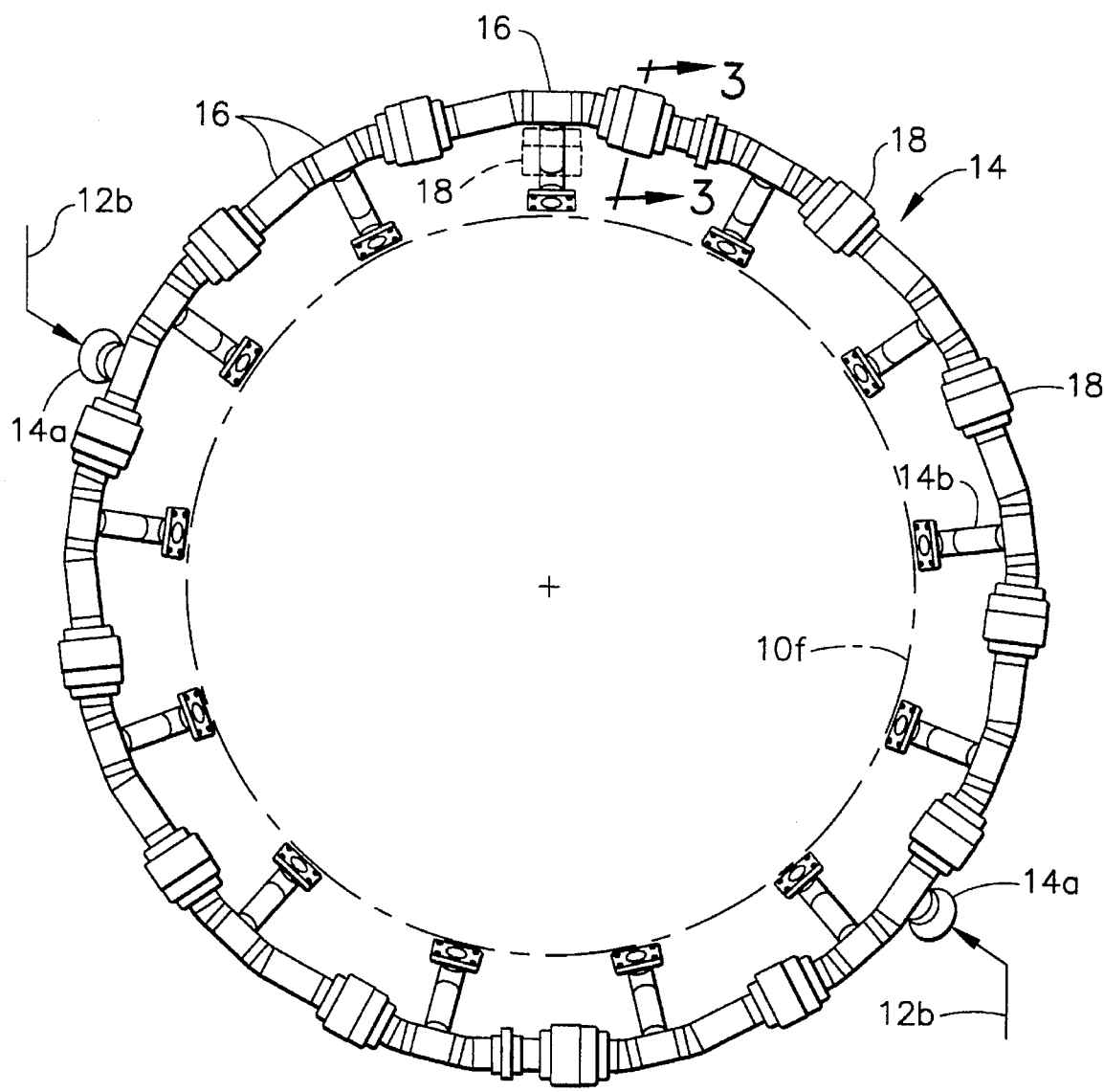
FIG. 2 is a radial view of an exemplary articulated air manifold surrounding the low pressure turbine illustrated in FIG. 1 and taken generally along line 2—2, and includes a plurality of expansion joints in accordance with one embodiment of the present invention.

The bleed air system includes an annular, multi-component air manifold 14 which receives the cooling air 12b and suitably disperses the cooling air to the various components within the low pressure turbine 10f. FIG. 2 illustrates an exemplary embodiment of the manifold 14 surrounding the low pressure turbine 10f shown in phantom. The cooling air 12b is suitably channeled into the manifold 14 through conventional inlets 14a thereof. The air is discharged from the manifold 14 into the low pressure turbine 10f through conventional outlets 14b in the form of radially inwardly extending and axially inclined tubes. The cooling air 12b is distributed circumferentially around the manifold 14 through interconnected fluid carrying conduits indicated generally at 16. In accordance with one embodiment of the present invention, a plurality of expansion joints 18 are circumferentially spaced apart around the circumference of the manifold 14 between adjacent ones Of the manifold outlets 14b to accommodate differential thermal movement due to expansion and contraction during operation. Alternatively, the expansion joints 18 could instead be located in each of the manifold outlets 14b, one of which is illustrated in phantom at the 12:00 position in FIG. 2. In either embodiment, the expansion joints 18 are identically configured for effecting multi-degree-of-freedom (MDF) motion between the adjacent portions of the connected conduits.

Figure 3:
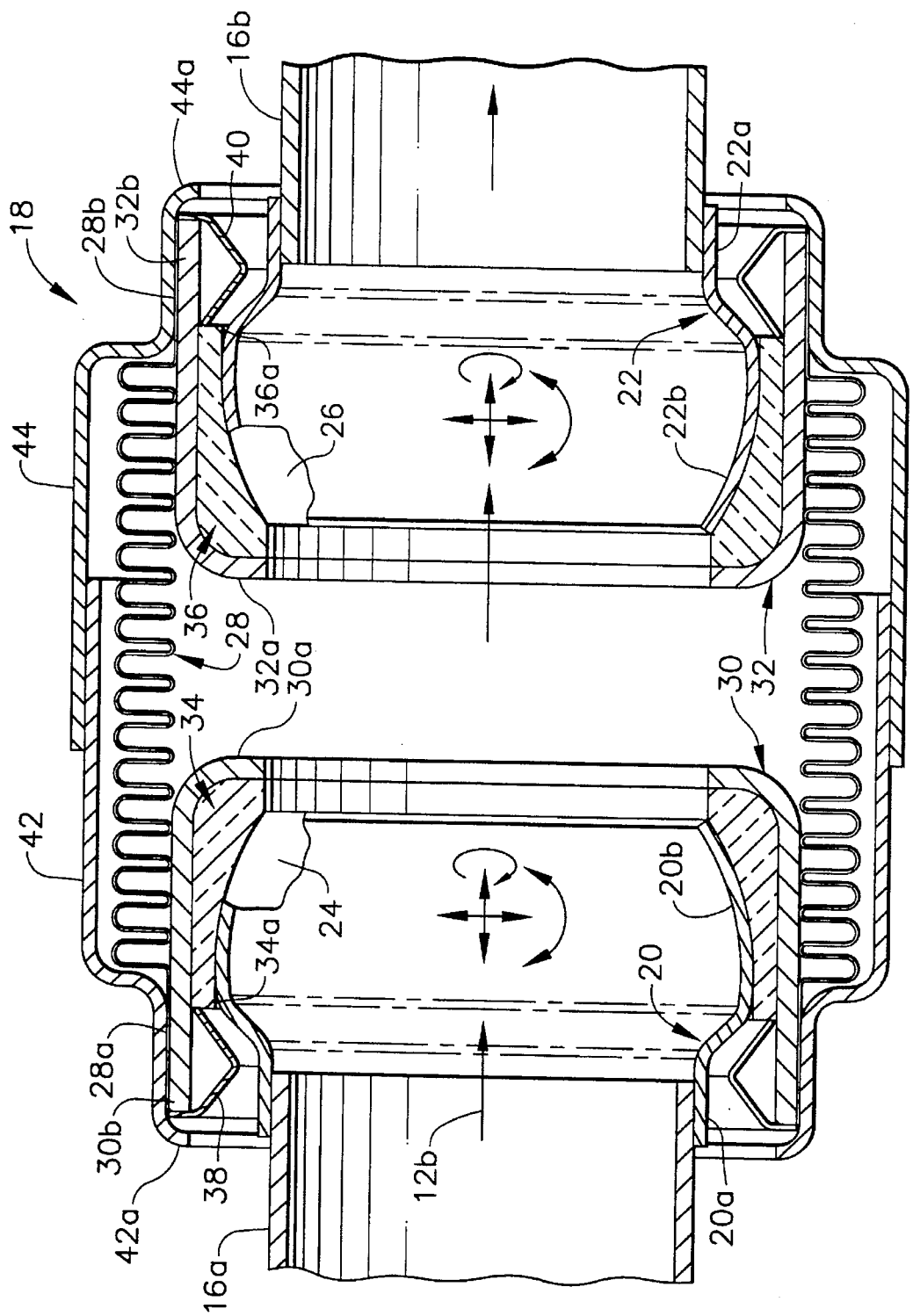
FIG. 3 is an elevational, sectional view of an exemplary embodiment of one of the expansion joints illustrated in FIG. 2 and taken generally along line 3—3.
Figure 4:
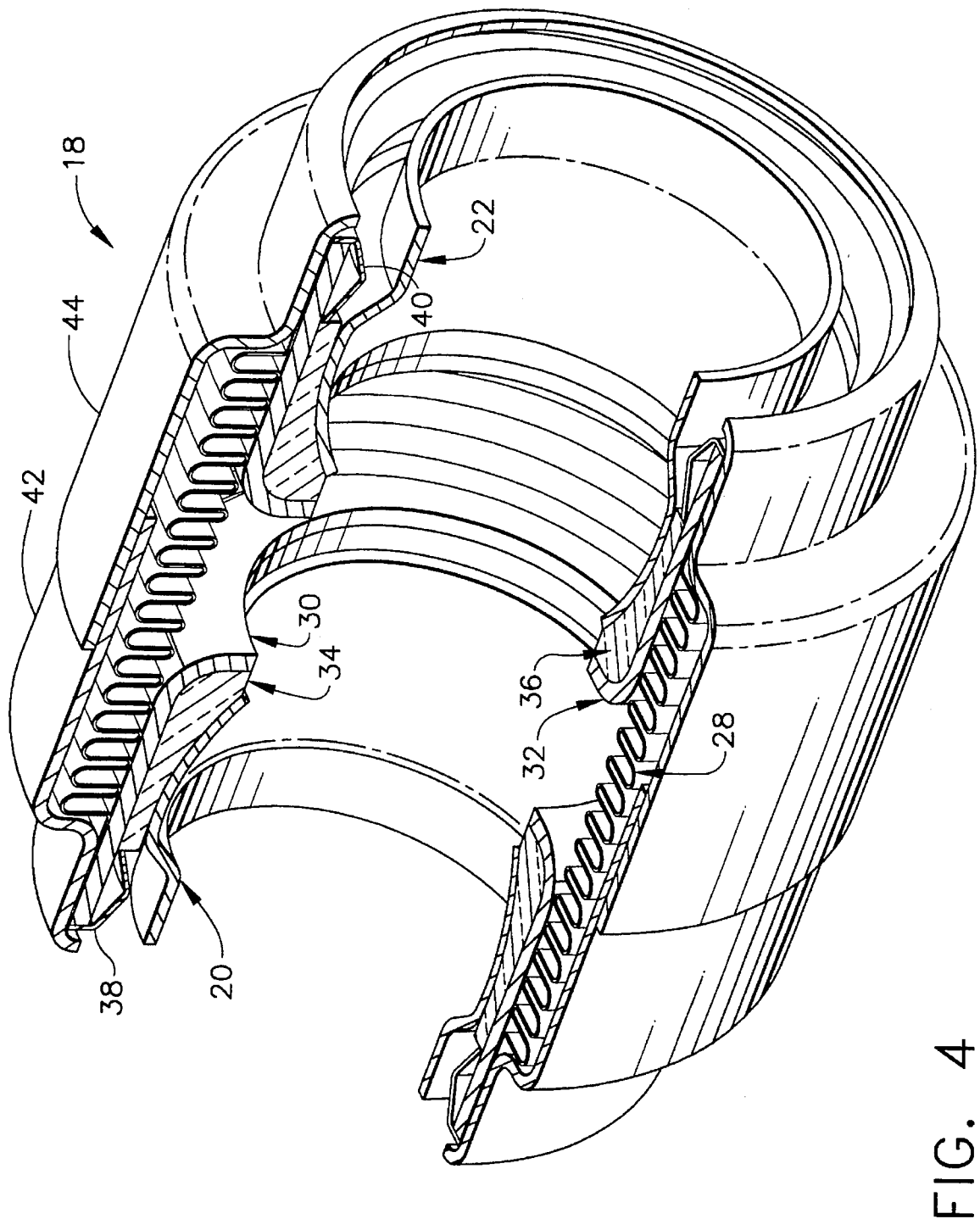
FIG. 4 is a perspective, partly cut away view of the exemplary expansion joint illustrated in FIGS. 2 and 3.

More specifically, FIG. 3 illustrates an exemplary one of the expansion joints 18 wherein the interconnected conduits are defined as a first conduit 16a which enters the joint 18 from one side, and a second conduit 16b which enters the joint 18 from an opposite side. In this exemplary embodiment, the joint 18 carries therethrough and between the conduits 16a,b the cooling air 12b. A cutaway perspective view of the expansion joint 18 itself is illustrated in FIG. 4.

In accordance with one embodiment of the present invention, the MDF joint 18 includes a tubular first fitting 20 having at a proximal end thereof a cylindrical first sleeve 20a for being conventionally fixedly joined to the end of the first conduit 16a by welding or brazing for example. Disposed at an opposite, distal end of the first fitting 20 is a first ball 20b which is a truncated spherical section having a convex annular outer surface which is smooth. Similarly, a substantially identical tubular second fitting 22 includes at a proximal end thereof a cylindrical second sleeve 22a which is fixedly joined to a corresponding end of the second conduit 16b. The second fitting 22 includes a second ball 22b at its distal end which is also a truncated spherical section having a convex annular outer surface which is also smooth.

A first socket 24 receives the first ball 20b for pivotal and rotary, or torsional, movement therein and is complementary in shape, and also in the form of a truncated spherical section having a matching annular concave inner surface. A similar second socket 26 receives the second ball 22b for pivotal and rotary, or torsional, movement therein, with the second socket 26 being complementary in shape to the second ball 22b, and also being a truncated spherical section having a matching concave smooth inner surface.

The first and second fittings 20, 22 are axially spaced apart from each other, and a tubular bellows 28 extends therebetween and is disposed coaxially with the first and second sockets 24, 26. The bellows 28 has axially opposite first and second distal ends 28a and 28b, with the first end 28a being fixedly and sealingly joined to the first socket 24, and the second end 28b being similarly fixedly and sealingly joined to the second socket 26. In this way, the bellows 28 sealingly joins together the sockets 24, 26 and the cooperating balls 20b, 22b, for accommodating axial differential movement therebetween. Additional differential movement is permitted between the sockets 24, 26, with the balls 20b, 22b being pivotable and rotatable in the respective first and second sockets 24, 26. In this way, a multi-degree-of-freedom (MDF) expansion joint 18 is effected which allows significant differential movement between the connecting first and second conduits 16a and 16b. And, effective sealing against leakage of the cooling air 12b from the joint 18 is also provided.

More specifically, the bellows 28 may be sized and configured for having a suitable spring constant so that during assembly, the bellows 28 is initially compressed and thereafter creates compressive loads in opposite directions against the sockets 24, 26 for maintaining seating of the respective balls 20b, 22b therein. The sockets 24, 26 may be simply a suitable metal either alone or containing a suitable wear resistant spray coating thereon such as Copper-Nickel-Indium or Nickel-Graphite which are commercially available. However, improved sealing for extended periods of time may be obtained by using a separate, replaceable sealing member.

More specifically, the expansion joint 18 preferably includes a tubular first sleeve or cup 30 which surrounds the first ball 20b and has at a distal end thereof a first base 30a in the form of a flat disk with a center hole, and at an opposite proximal end thereof a cylindrical first rim 30b which is suitably fixedly joined to the bellows first end 28a by conventional resistance welding for example. Similarly, a tubular second sleeve or cup 32 surrounds the second ball 22b and has at a distal end thereof a second base 32a in the form of a flat disk with a center hole, and at an opposite proximal end thereof a cylindrical second rim 32b suitably fixedly joined to the bellows second end 28b by resistance welding for example.

A replaceable annular first seal 34 is complementary in configuration with the inside of the first cup 30 and is suitably seated therein, and has a spherical inner surface which defines the first socket 24 which receives in pivotal sealing contact the first ball 20b. Similarly, a replaceable annular second seal 36 is complementary in configuration with the inside of the second cup 32 and is suitably seated therein, and has a spherical inner surface defining the second socket 26 which receives in pivotal sealing contact the second ball 22b. The first and second seals 34, 36 may be formed of any conventional material for providing an effective sliding sealing fit with the respective balls 20b, 22b. In the exemplary embodiments illustrated in FIG. 3 for the aircraft engine environment, the seals 34, 36 are preferably conventional graphite seals which are simply press-fit into the respective first and second cups 30, 32 and are separately replaceable upon disassembly of the first and second balls 20b, 22b from their respective first and second sockets 24, 26. In this way, the seals 34, 36 may be readily replaced as required during service.

More specifically, the first and second seals 34, 36 are preferably identical to each other with each having a respective cylindrical access hole 34a, 36a disposed coextensively with the respective entrances to the first and second sockets 24, 26. The first and second access holes 34a, 36a are suitably larger in diameter than the respective diameters of the first and second balls 20b, 22b for axially receiving the balls 20b, 22b during assembly for seating against the respective first and second sockets 24, 26.

In order to retain the respective balls in their sockets, respective first and second retainers 38 and 40 in the form of split rings are disposed adjacent to the respective first and second cup rims 30b, 32b for retaining the first and second balls 20b, 22b in their respective first and second sockets 24, 26. The retainers 38, 40 also retain the seals 34, 36 in their respective cups 30, 32.

As shown in FIG. 3, each of the balls 20b, 22b is free to pivot or rotate torsionally in its respective socket 24, 26 in a conventional ball-and-socket joint arrangement. The respective sockets 24, 26 are flexibly joined together through the common bellows 28 joined at opposite ends to the first and second cups 30, 32. In this way, the two balls 20b and 22b are also allowed to translate axially relative to each other as well as laterally in the radial direction. The resulting expansion joint 18 therefore allows substantial multi-degree-of-freedom movement between the two captured balls 20b and 22b joined to the respective ends of the first and second conduits 16a, 16b for ease of assembly and for accommodating differential thermal movement therebetween including expansion and contraction. Furthermore, the ball-and-socket joints and the bellows 28 therebetween ensures effective sealing of the cooling air 12b between the conduits 16a, 16b, which can improve over time as the balls 20b, 22b wear into their respective sockets 24, 26 formed in the graphite seals 34, 36. As the balls pivot and/or rotate in the sockets during differential expansion and contraction, the seats defined by the sockets 24, 26 are self-renewing since abrasion or wear thereof improves the seating of the respective balls 20b, 22b therein.

Furthermore, the bellows 28 is inherently flexible and axially compressible so that during assembly it may be initially compressed for effecting compressive loads in opposite directions on the first and second cups 30, 32 to urge the first and second seals 34, 36 in sealing contact with the first and second balls 20b, 22b. This firmly seats the balls in their respective sockets. And, the pressure of the cooling air 12b itself inside the expansion joint 18 additionally provides pressure forces acting against the bases of the cups 30, 32 to additionally urge the seals 34, 36 in contact with the balls 20b, 22b for additionally improving the pressure seating thereof. Accordingly, effective and long lasting sealing is maintained over the useful life of the joint 18 irrespective of the differential thermal movement between the conduits 16a,b and the respective balls joined to the ends thereof.

The bellows 28 may be protected from damage by including first and second telescoping annular shrouds 42, 44 fixedly joined at proximal ends thereof to the respective first and second cup rims 30b, 32b. In the exemplary embodiment illustrated in FIG. 3, the proximal ends of the shrouds 42, 44 surround the ends of the bellows 28 and are conventionally resistance welded to the bellows ends which in turn are resistance welded to the cups 30, 32. The distal ends of the shrouds 42, 44 preferably overlap each other for a suitable axial distance for telescopically accommodating differential axial movement of the first and second cups 30, 32 which expands and contracts the bellows 28.

In the preferred embodiment illustrated in FIG. 3, the distal end portions of the shrouds 42, 44 are preferably cylindrical and are suitably sized in diameter to form a sliding close fit therebetween to effect air damping of the joint 18 upon axial differential movement. The volume between the shrouds 42, 44 and the bellows 28 is thereby suitably enclosed, with telescoping of the shrouds 42, 44 therefore compressing or expanding the air trapped therein, with corresponding leakage or rushing of the air between the overlapping joint to uniquely effect air damping. In the vibratory environment of a gas turbine engine, this air damping can effectively reduce vibratory response of the expansion joint 18. The overlapping of the shrouds 42, 44 also restrains lateral bending of the bellows 28, with lateral offset between the first and second conduits 16a,b being primarily accommodated by pivoting of the respective balls in their sockets. Preventing lateral bending of the bellows 28 can improve the useful life thereof.

The shrouds 42, 44 may be used to advantage in an exemplary embodiment for capturing the retainers 38, 40. As illustrated in FIG. 3, each of the shrouds 42, 44 includes a respective first and second integral lip 42a, 44a at the proximal ends thereof. These lips may be simply formed by plastically rolling the ends of the shrouds 42, 44 to create a suitable radius around the circumference thereof. The lips 42a, 44a are preferably spaced axially from the respective first and second cup rims 30b, 32b so that the retainers 38, 40 may be secured within the lips for retaining both the balls 20b, 22b and their cooperating seals 34, 36 in the respective cups 30, 32. In the preferred embodiment illustrated in FIG. 3, each of the retainers 38, 40 has a generally V-shaped radial section, with a first leg adjoining the respective lips 42a, 44a and trapped thereby, and a second leg adjoining the respective seals 34, 36 and balls 20b, 22b. The inclined legs are generally parallel to the back sides of the respective balls 20b, 22b for providing a large contact surface area for retaining the balls in their sockets. And, the retainers 38, 40 may be formed of suitable thin sheet metal for reducing weight of the joint 18. The split retainers 38, 40 may be simply removed through the respective orifices defined by the lips 42a, 44a, which then allows the respective balls to be removed from their sockets for access to the seals 34, 36 which may then be removed and replaced as desired.

The envelope of the joint 18 illustrated in FIG. 3 may be reduced if desired by relocating the bellows 28 axially between the two cups 30, 32 (not shown). A conventional flow liner (not shown) may be installed between the central orifices of the cups 30, 32 for reducing pressure drop and reducing the risk of damage to the bellows 28 from inside.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is claimed and desired to be secured by Letters Patent of the United States is the invention as defined and differentiated in the following claims:

1. An expansion joint for joining together first and second fluid conduits comprising:

a tubular first fitting having at a proximal end thereof a first sleeve for being fixedly joined to said first conduit, and at a distal end thereof a first ball;

a tubular second fitting having at a proximal end thereof a second sleeve for being fixedly joined to said second conduit, and at a distal end thereof a second ball spaced axially from said first ball in flow communication therewith;

a first socket receiving said first ball for pivotal movement therein;

a second socket receiving said second ball for pivotal movement therein;

a tubular bellows disposed coaxially with said first and second sockets and having opposite first and second distal ends, said bellows accommodating differential movement between said first and second sockets, with said first and second balls being pivotable therein;

a tubular first cup having a first base at a distal end thereof, and a cylindrical first rim at an opposite proximal end thereof fixedly joined to said bellows first end;

a tubular second cup having a second base at a distal end thereof, and a cylindrical second rim at an opposite proximal end thereof fixedly joined to said bellows second end;

an annular first seal being complementary to said first cup and being seated therein, and having a spherical inner surface defining said first socket receiving in pivotal sealing contact said first ball; and an annular second seal being complementary to said second cup and being seated therein, and having a spherical inner surface defining said second socket receiving in pivotal sealing contact said second ball; and wherein said first seal further includes a cylindrical first access hole disposed coextensively with said first socket and being larger than said first ball for axially receiving said first ball for seating against said first socket; and said second seal further includes cylindrical second access hole disposed coextensively with said second socket and being larger than said second ball for axially receiving said second ball for seating against said second socket.

2. A joint according to claim 1 further comprising first and second retaining means disposed adjacent to said first and second cup rims, respectively, for retaining said first and second balls in said respective first and second sockets.

3. A joint according to claim 2 further comprising first and second telescoping shrouds fixedly joined at proximal ends thereof to said first and second cup rims, respectively, with distal ends thereof overlapping each other for telescopically accommodating differential axial movement of said first and second cups expanding and contracting said bellows.

4. A joint according to claim 3 wherein said first and second shrouds are cylindrical adjacent to said distal ends thereof and are sized to form a sliding fit therebetween to effect air damping of said joint upon said differential axial movement.

5. A joint according to claim 3 wherein said bellows is axially compressible for effecting compressive loads in opposite directions on said first and second cups to urge said first and second seals in sealing contact with said first and second balls.

6. A joint according to claim 3 wherein said first and second seals comprise graphite being press-fit into said first and second cups, and are separately replaceable upon disassembly of said balls from said sockets after removal of said retaining means.

7. A joint according to claim 3 further comprising first and second lips defined at said first and second shroud proximal ends, respectively, and disposed adjacent to said first and second cup rims, and said first and second retaining means are secured within said lips for retaining both said balls and cooperating seals in said respective cups.

8. A joint according to claim 7 wherein said first and second retaining means have generally V-shaped radial sections, with a first leg adjoining said respective lips, and a second leg adjoining said respective seals and balls.

* * * * *